US009531792B2

(12) United States Patent
Chen et al.

(10) Patent No.: US 9,531,792 B2
(45) Date of Patent: Dec. 27, 2016

(54) SYSTEM AND METHOD FOR GENERATING INFORMATION FILE BASED ON PARALLEL PROCESSING

(75) Inventors: Lin Chen, Shanghai (CN); Yuming Mao, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 427 days.

(21) Appl. No.: 14/007,963

(22) PCT Filed: Mar. 30, 2012

(86) PCT No.: PCT/CN2012/073316
§ 371 (c)(1),
(2), (4) Date: Dec. 5, 2013

(87) PCT Pub. No.: WO2012/130162
PCT Pub. Date: Oct. 4, 2012

(65) Prior Publication Data
US 2014/0082053 A1    Mar. 20, 2014

(30) Foreign Application Priority Data

Mar. 30, 2011  (CN) .......................... 2011 1 0080826

(51) Int. Cl.
*H04L 29/08*         (2006.01)
*G06F 17/30*        (2006.01)

(52) U.S. Cl.
CPC ......... *H04L 67/10* (2013.01); *G06F 17/30067* (2013.01)

(58) Field of Classification Search
CPC .......... H04L 41/00; H04L 43/00; H04L 51/00; H04L 61/00; H04L 65/00; H04L 67/00; H04L 69/00; H04L 67/10; H04L 29/06047; H04L 29/0872; H04L 29/08522; H04L 29/08225; H04L 29/08162; H04L 67/1002; H04L 67/42; H04L 67/1091; G06F 17/30067
See application file for complete search history.

(56) References Cited

U.S. PATENT DOCUMENTS 5,682,507 A * 10/1997 Phillips ................... G06F 9/546
                                                                    709/203
8,234,338 B1 *  7/2012 Dagum ................... H04L 51/30
                                                                    709/201
(Continued)

FOREIGN PATENT DOCUMENTS

CN         1385970 A       12/2002
CN         1482766 A        3/2004
(Continued)

OTHER PUBLICATIONS

IBM, et al., "Simultaneously monitor dynamic file updates on J2EE application server using web browser," *ip.com Journal*, Apr. 27, 2007, West Henrietta, NY, XP13120279A, 2 pages.

*Primary Examiner* — Wing F Chan
*Assistant Examiner* — Billy H Ng
(74) *Attorney, Agent, or Firm* — Blakely Sokoloff Taylor & Zafman LLP (57) ABSTRACT

The present invention proposes a information file generating system and method based on parallel processing. Wherein, said information file generating system based on parallel processing comprises a file request processing device, a control device, a temporary task processing device, an abnormity processing device and an input/output device. Among them, said file request processing device is used to receive and analyze a file request instruction from an application server, and create an information file generation task and at least one temporary information file generation task according to the result of the analysis. The information file generating system and method based on parallel processing (Continued)

disclosed in the present invention are easy to be operated, can ensure the real-time performance and accuracy, and can improve the work efficiency and performance of the system.

13 Claims, 2 Drawing Sheets

(56) References Cited

U.S. PATENT DOCUMENTS

| | | | |
|---|---|---|---|
| 2007/0011300 A1* | 1/2007 | Hollebeek | G06F 11/0715 709/224 |
| 2007/0229878 A1* | 10/2007 | Pandit | G06F 3/1207 358/1.15 |
| 2009/0193427 A1* | 7/2009 | Pu | G06F 9/5072 718/104 |
| 2009/0292882 A1* | 11/2009 | Li | G06F 12/0866 711/141 |
| 2010/0333094 A1* | 12/2010 | Restall | G06F 9/5027 718/102 |
| 2011/0258179 A1* | 10/2011 | Weissman | G06F 17/30389 707/714 |
| 2012/0059934 A1* | 3/2012 | Rafiq | H04L 67/1008 709/225 |
| 2012/0185516 A1* | 7/2012 | Xu | G06F 17/30115 707/803 |

FOREIGN PATENT DOCUMENTS

| | | |
|---|---|---|
| CN | 1835499 A | 9/2006 |
| CN | 101145150 A | 3/2008 |
| CN | 101425167 A | 5/2009 |
| CN | 101751397 A | 6/2010 |
| EP | 0747813 A2 | 12/1996 |
| WO | WO2011133195 * | 10/2011 |

* cited by examiner

SYSTEM AND METHOD FOR GENERATING INFORMATION FILE BASED ON PARALLEL PROCESSING

TECHNICAL FIELD

The present invention relates to the information file generating system and method, and more specifically, to the information file generating system and method based on parallel processing.

BACKGROUND

At present, with the increasingly growth of information data processing demands and increasingly enrichment of business types in different fields, the information file (e.g. chronological file in the telecommunication and financial systems, which is one of the effective means of transaction details matching and blending by related parties generating system and method becomes more and more important.

Since there is no need of highly real-time performance and the amount of data is less, the existing information file generating system and method usually employs the export functions of the database system itself or employs dedicated data export program developed for different applications so as to generate said information file.

However, with the increasingly growth of information data processing demands and increasingly enrichment of business types in different fields, the requirements for the real-time performance of generating information file become more and more strict, and with the rapid expansion of the amount of data as well as the further requirements from related parties on the custom contents (i.e., the specific contents associated with different applications), the existing information file generating system and method more and more cannot satisfy the requirements for the real-time performance.

Therefore, there exists the following demands: providing an information file generating system and method based on parallel processing, which is easy to be operated, and can ensure the real-time performance and accuracy, as well as can improve the work efficiency and performance of the system.

SUMMARY

In order to solve the deficiency presented in the existing technical solution described above, the present invention proposes an information file generating system and method based on parallel processing.

The object of the present invention is realized through the following technical solution:

An information file generating system based on parallel processing, said information file generating system based on parallel processing comprising:

a file request processing device for receiving and analyzing a file request instruction from an application server, and creating an information file generation task and at least one temporary information file generation task according to the result of the analysis;

a control device for monitoring the execution of said information file generation task and updating the state of the task, and constructing a response information related to the generation condition of an information file;

a temporary task processing device for processing said at least one temporary information file generation task based on a database and updating the state of said at least one temporary information file generation task;

an abnormity processing device for processing abnormal events for said at least one temporary information file generation task;

an input/output device for transmitting said response information to said application server according to the instruction of said control device, and receiving a confirmation message from said application server.

In the solutions disclosed above, preferably, said file request processing device further comprising:

a request analyzing module for analyzing said file request instruction, and creating said information file generation task in an information file task table according to the results of the analysis;

a task decomposition module for decomposing said information file generation task based on said file request instruction and according to the number of records in said database and the distribution regularities of the records to be processed, and creating said at least one temporary information file generation task in an information file task temporary table.

In the solutions disclosed above, preferably, said control device further comprising:

a state monitoring module for monitoring the tasks in said information file task table and said information file task temporary table and updating the state of the tasks;

a file generation module for combining the files generated based on said information file generation task according to said updated state of the tasks, and constructing the response information related to the generation condition of the information file.

In the solutions disclosed above, preferably, said file generation module is further used to add labels and safety control information for said combined files.

In the solutions disclosed above, preferably, said information file task table has at least one state flag bit corresponding to each of said temporary information file generation task.

In the solutions disclosed above, preferably, each of said information file task temporary table has the state flag bit corresponding to the temporary information file generation task represented by it.

In the solutions disclosed above, preferably, when the state of said temporary information file generation task changes, said state monitoring module updates the state of the state flag bit corresponding to said temporary information file generation task in said information file task table.

In the solutions disclosed above, preferably, said information file task table corresponds to said at least one information file task temporary table.

In the solutions disclosed above, preferably, when the state flag bit in information file task table indicates "temporary file is being generated", said state monitoring module queries said at least one information file task temporary table, and when it is found that all of said temporary information file generation tasks corresponding to said at least one information file task temporary table are completed, said state monitoring module updates the state flag bit in said information file task table into indicating "the generating of the temporary file is completed".

In the solutions disclosed above, optionally, when a portion of said temporary information file generation tasks corresponding to said at least one information file task temporary table are terminated abnormally, said state monitoring module updates the state flag bit in said information file task table into indicating "temporary file is terminated abnormally", and no longer continue to process said temporary information file generation task which is terminated abnormally.

In the solutions disclosed above, optionally, when there occurs the abnormal termination in said temporary information file generation task corresponding to said at least one information file task temporary table, said state monitoring module updates the state flag bit in said information file task table into indicating "regenerating", and restart to process said abnormally terminated temporary information file generation task.

In the solutions disclosed above, preferably, when there occurs the abnormal termination in all of said temporary information file generation tasks corresponding to said at least one information file task temporary table, said state monitoring module updates the state flag bit in said information file task table into indicating "the file is terminated abnormally".

In the solutions disclosed above, preferably, when the state flag bit in said information file task table indicates "the generating of temporary file is completed", said file generation module combines the files generated based on said information file generation task and adds labels and safety control information for said combined files, as well as updates the state flag bit in said information file task table into indicating "the generating of file is completed".

In the solutions disclosed above, preferably, when the state flag bit in said information file task table indicates "the generating of file is completed" or "the file is terminated abnormally", said file generation module construct the response information related to the generation condition of the information file, and transmits said response information to said input/output device, as well as updates the state flag bit in said information file task table into indicating "normal completed all" or "abnormal completed all".

In the solutions disclosed above, preferably, said response information comprises the finally generated information file.

In the solutions disclosed above, preferably, said temporary task processing device concurrently processes multiple temporary information the generation tasks.

In the solutions disclosed above, preferably, said abnormity processing device employs a polling mode to monitor said information file task temporary table one by one in real-time, and investigates temporary information file generation task having the state of "abnormal" or "pseudo normal".

In the solutions disclosed above, preferably, said abnormity processing device processes the investigated abnormal temporary information file generation task, and updates the state of said temporary information file generation task into "normal" after the processing is completed, as well as reschedules said temporary task processing device.

In the solutions disclosed above, preferably, said input/output device updates said information file task table based on the response instruction sent by said application server.

The object of the present invention is also realized through the following technical solutions:

An information file generating method based on parallel processing, said information file generating method based on parallel processing comprises the following steps:

(A1) receiving a file request instruction from an application server;

(A2) analyzing said file request instruction, and creating an information file generation task and at least one temporary information file generation task according to the result of the analysis;

(A3) processing said at least one temporary information file generation task based on a database and updating the state of said at least one temporary information file generation task;

(A4) monitoring the execution of said at least one temporary information file generation task and updating the state of the tasks, and constructing a response information related to the generation condition of the information file when the execution of all of said temporary information file generation tasks is completed;

(A5) transmitting said response information to said application server.

In the solutions disclosed above, preferably, said step (A2) further comprises:

(B1) analyzing said file request instruction, and creating said information file generation task in an information file task table according to the results of the analysis;

(B2) decomposing said information file generation task based on said file request instruction and according to the number of records in said database and the distribution regularities of the records to be processed, and creating said at least one temporary information file generation task in an information file task temporary table.

In the solutions disclosed above, preferably, said step (A4) further comprises:

(C1) monitoring the tasks in said information file task table and said information file task temporary table and updating the state of the tasks;

(C2) combining the files generated based on said information file generation task according to said updated state of the tasks, and constructing the response information related to the generation condition of the information file.

In the solutions disclosed above, preferably, said step (C2) further comprises adding labels and safety control information for said combined files.

In the solutions disclosed above, preferably, said information file task table has at least one state flag bit corresponding to each of said temporary information file generation task.

In the solutions disclosed above, preferably, each of said information file task temporary table has the state flag bit corresponding to the temporary information file generation task represented by it.

In the solutions disclosed above, preferably, when the state of said temporary information file generation task changes, the state of the state flag bit corresponding to said temporary information file generation task in said information file task table is updated.

In the solutions disclosed above, preferably, said information file task table corresponds to said at least one information file task temporary table.

In the solutions disclosed above, preferably, when the state flag bit in said information file task table indicates "temporary the is being generated", said at least one information file task temporary table is queried, and when it is found that all of the temporary information file generation tasks corresponding to said at least one information file task temporary table are completed, the state flag bit in said information file task table is updated into indicating "the generating of the temporary file is completed".

In the solutions disclosed above, optionally, when a portion of said temporary information file generation tasks corresponding to said at least one information file task temporary table are terminated abnormally, the state flag bit in said information file task table is updated into indicating "temporary file is terminated abnormally", and the abnormally terminated temporary information file generation task will no longer be processed continuatively.

In the solutions disclosed above, optionally, when there occurs the abnormal termination in said temporary information file generation task corresponding to said at least one information file task temporary table, the state flag bit in said information file task table is updated into indicating "regenerating", and said abnormally terminated temporary information file generation task is restarted to be processed.

In the solutions disclosed above, preferably, when there occurs the abnormal termination in all of said temporary information file generation tasks corresponding to said at least one information file task temporary table, the state flag bit in said information file task table is updated into indicating "the file is terminated abnormally".

In the solutions disclosed above, preferably, when the state flag bit in said information file task table indicates "the generating of temporary file is completed", the files generated based on said information file generation task are combined and labels and safety control information are added to said combined files, as well as the state flag hit in said information file task table is updated into indicating "the generating of file is completed".

In the solutions disclosed above, preferably, when the state flag bit in said information file task table indicates "the generating of file is completed" or "the file is terminated abnormally", the response information related to the generation condition of the information file is constructed, and said response information is transmitted to said application server, as well as the state flag bit in said information file task table is updated into indicating "normal completed all" or "abnormal completed all".

In the solutions disclosed above, preferably, said response information comprises the finally generated information file.

In the solutions disclosed above, preferably, multiple temporary information file generation tasks are concurrently processed.

In the solutions disclosed above, preferably, a polling mode is employed to monitor said information file task temporary table one by one in real-time, and the temporary information file generation tasks whose state are "abnormal" or "pseudo normal" are investigated.

In the solutions disclosed above, preferably, the investigated abnormal temporary information file generation task is processed, and the state of said temporary information file generation task is updated into "normal" after the processing is completed, as well as said temporary information file generation task is re-executed.

In the solutions disclosed above, preferably, said information file task table is updated based on the response instruction sent by said application server.

The information file generating system and method based on parallel processing disclosed in the present invention have the following advantages: it is easy to be operated, it can ensure the real-time performance and accuracy, and can improve the work efficiency and performance of the system; it is capable of achieving an efficient generation processing of files with a large amount of data, and have a strong ability of fault tolerance and control, and thus have a better portability and expansibility.

BRIEF DESCRIPTION OF THE DRAWINGS

The technical features and advantages of the present invention will be better appreciated by one skilled in the art in conjunction with the accompanying drawings, in which.

DETAILED DESCRIPTION

Figure 1:
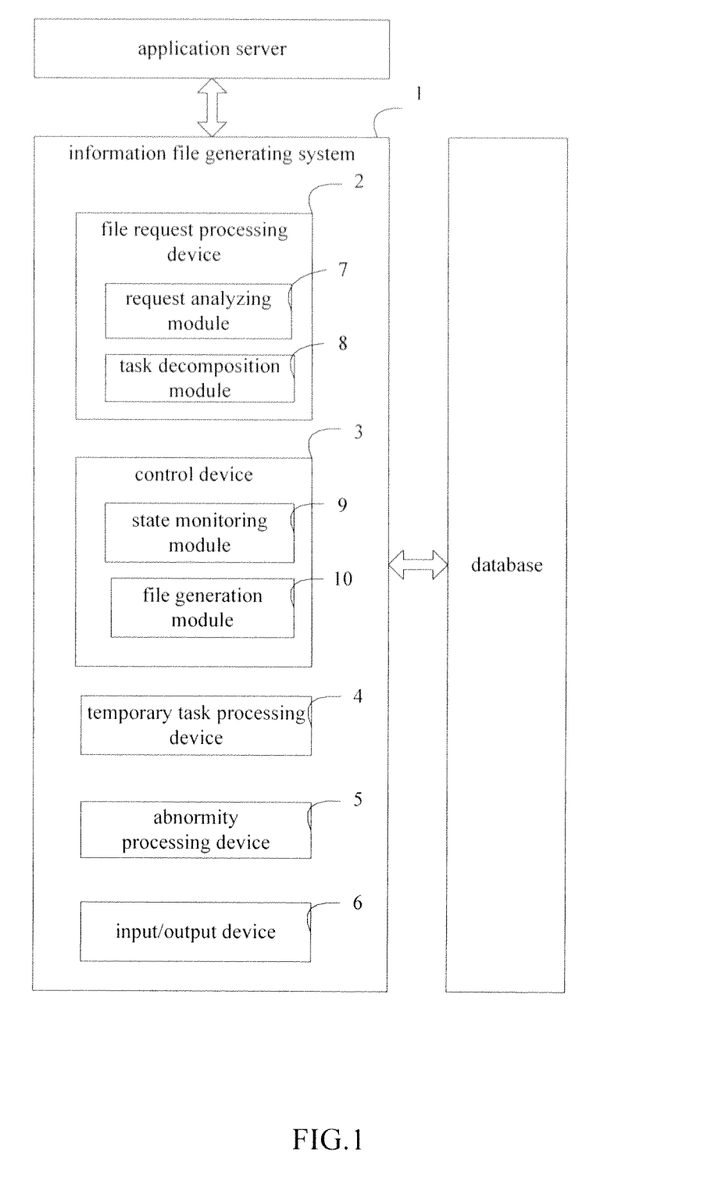
FIG. 1 is the structure diagram of the information file generating system based on parallel processing according to the embodiment of the present invention.

FIG. 1 is the structure diagram of the information file generating system based on parallel processing according to the embodiment of the present invention. As shown in FIG. 1, exemplarily, the information file generating system based on parallel processing 1 disclosed in the present invention comprises a file request processing device 2, a control device 3, a temporary task processing device 4, an abnormity processing device 5 and an input/output device 6. Among them, said file request processing device 2 is used to receive and analyze a file request instruction from an application server, and to create an information file generation task and at least one temporary information file generation task according to the result of the analysis. Said control device 3 is used to monitor the execution of said information file generation task and update the state of the tasks, and to construct a response information related to the generation condition of the information file. Said temporary task processing device 4 is used to process said at least one temporary information file generation task based on a database and update the state of said at least one temporary information file generation task. Said abnormity processing device 5 is used to process abnormal events for said at least one temporary information file generation task. The input/output device 6 is used to transmit said response information to said application server according to the instruction of said control device, and to receive a confirmation message from said application server.

As shown in FIG. 1, exemplarily, in the information file generating system based on parallel processing 1 disclosed in the present invention, said file request processing device 2 further comprises a request analyzing module 7 and a task decomposition module 8. Among them, said request analyzing module 7 is used to analyze said file request instruction, and create said information file generation task in an information file task table according to the results of the analysis. Said task decomposition module 8 is used to decompose said information file generation task based on said file request instruction and according to the number of records in said database and the distribution regularities of the records to be processed, and to create said at least one temporary information file generation task in an information file task temporary table.

As shown in FIG. 1, exemplarily, in the information file generating system based on parallel processing 1 disclosed in the present invention, said control device 3 further comprises a state monitoring module 9 and a file generation module 10. Said state monitoring module 9 is used to monitor the tasks in said information file task table and said information file task temporary table and to update the state of the tasks. Said file generation module 10 is used to combine the files generated based on said information file generation task according to said updated state of the tasks, and to construct the response information related to the generation condition of the information file. Preferably, said file generation module is further used to add labels and safety control information for said combined files.

Preferably, in the information the generating system based on parallel processing 1 disclosed in the present invention, said information file task table has at least one state flag bit corresponding to each of said temporary information file generation task.

Preferably, in the information file generating system based on parallel processing 1 disclosed in the present invention, each of said information file task temporary table has the state flag bit corresponding to the temporary information file generation task represented by it.

From the above, in the information file generating system based on parallel processing 1 disclosed in the present invention, the information file task temporary table is used, and at least one temporary information file generation task is created therein. Therefore, in the case where the amount of data corresponding to said file request instruction is very large, and generating information file is much time-consuming, it is possible to decompose one larger task into multiple smaller tasks, which can make full use of the concurrent characteristic of the system in order to enhance the capacity of generating information file greatly. On the other hand, it is possible to reduce the coupling degree between modules in the system and it will reduce the particle size of abnormity processing, thereby may improve the generation efficiency of information file significantly.

Preferably, in the information file generating system based on parallel processing 1 disclosed in the present invention, when the state of said temporary information file generation task (e.g. completed, abnormal termination, or the like) changes, said state monitoring module 9 updates the state of the state flag bit corresponding to said temporary information file generation task in said information file task table.

Preferably, in the information file generating system based on parallel processing 1 disclosed in the present invention, said information file task table corresponds to said at least one information file task temporary table (i.e., the correspondence between said information file task table and said at least one information file task temporary table is 1:N (N>=1), therefore, said state monitoring module 9 needs to monitor the state information of 1+N pieces of tasks in real-time).

Preferably, in the information file generating system based on parallel processing 1 disclosed in the present invention, when the state flag bit in said information file task table indicates "temporary file is being generated", said state monitoring module 9 query said at least one information file task temporary table, and when it is found that all of said temporary information file generation tasks corresponding to said at least one information file task temporary table are completed, said state monitoring module 9 updates the state flag bit in said information file task table into indicating "the generating of the temporary file is completed".

Preferably, in the information file generating system based on parallel processing 1 disclosed in the present invention, when a portion of said temporary information file generation tasks corresponding to said at least one information file task temporary table are terminated abnormally, said state monitoring module 9 updates the state flag bit in said information file task table into indicating "temporary file is terminated abnormally", and no longer continue to process the abnormally terminated temporary information the generation task.

Alternatively, in the information file generating system based on parallel processing 1 disclosed in the present invention, when there occurs the abnormal termination in said temporary information file generation task corresponding to said at least one information file task temporary table, said state monitoring module 9 updates the state flag bit in said information file task table into indicating "regenerating", and restart to process said abnormally terminated temporary information file generation task. One skilled in the art should understand that, the reasons of said abnormal termination can be an abnormal database connection, file NFS network interruption, or the like. From the above, when the typical abnormality described above occurs, by increasing the number of attempts, it is possible to enhance program adaptive fault tolerant ability and reduce the time consumption caused by re-processing of the entire task.

Preferably, in the information file generating system based on parallel processing 1 disclosed in the present invention, when there occurs the abnormal termination in all of said temporary information file generation tasks corresponding to said at least one information file task temporary table, said state monitoring module 9 updates the state flag bit in said information file task table into indicating "the file is terminated abnormally".

Preferably, in the information file generating system based on parallel processing 1 disclosed in the present invention, when the state flag bit in said information file task table indicates "the generating of temporary file is completed", said file generation module 10 combines the files generated based on said information file generation task and adds labels and safety control information for said combined files, as well as updates the state flag bit in said information file task table into indicating "the generating of file is completed".

Preferably, in the information file generating system based on parallel processing 1 disclosed in the present invention, when the state flag bit in said information file task table indicates "the generating of file is completed" or "the file is terminated abnormally", said file generation module 10 construct the response information related to the generation condition of the information file, and transmits said response information (including the finally generated information file) to said input/output device 6, as well as updates the state flag bit in said information file task table into indicating "normal completed all" or "abnormal completed all".

Preferably, in the information file generating system based on parallel processing 1 disclosed in the present invention, said temporary task processing device 4 concurrently (simultaneously) processes multiple temporary information file generation tasks. From the above, the information files generated by the information file generating system based on parallel processing disclosed in the present invention may provide personalized extraction, calculation and transformation of database records to file records.

Preferably, in the information file generating system based on parallel processing 1 disclosed in the present invention, said abnormity processing device 5 employs a polling mode to monitor said information file task temporary table one by one in real-time, and investigates temporary information file generation task whose state is "abnormal" or "pseudo normal". Preferably, said abnormity processing device 5 processes the investigated abnormal temporary information file generation task, and updates the state of said temporary information file generation task into "normal" after the processing is completed, as well as reschedules said temporary task processing device 4.

Preferably, said input/output device 6 can further updates said information file task table based on the response instruction (i.e., the confirmation message) sent by said application server.

As shown in FIG. 1, the basic operational principle of the information file generating system based on parallel processing disclosed in the present invention is as follows: said file request processing device 2 receiving and analyzing the file request instruction from said application server, and creating an information file generation task and at least one temporary information file generation task (i.e., said information file generation task being decomposed into at least one temporary information file generation task) according to the result of the analysis; said control device 3 monitoring the execution of said information file generation task and updating the state of the tasks, and constructing a response information (such response information comprises the finally generated information file) related to the generation condition of the information file when the execution of all of the temporary information file generation tasks is completed; said temporary task processing device 4 concurrently processing said at least one temporary information file generation task based on a database and updating the state of said at least one temporary information file generation task; said abnormity processing device 5 processing abnormal events for said at least one temporary information file generation task; said input/output device 6 transmitting said response information to said application server according to the instruction of said control device, and receiving a confirmation message from said application server.

Figure 2:
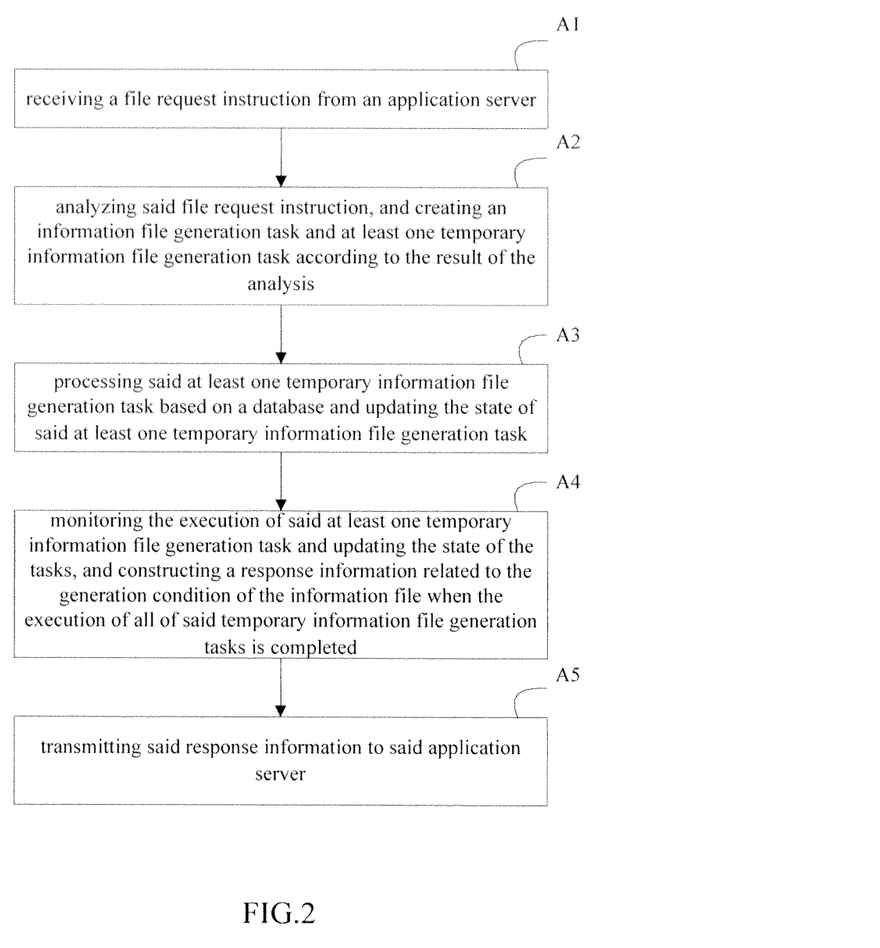
FIG. 2 is the flow chart of the information file generating method based on a parallel processing according to the embodiment of the present invention.

FIG. 2 is the flow chart of the information file generating method based on parallel processing according to the embodiment of the present invention. As shown in FIG. 2, the information file generating method based on parallel processing disclosed in the present invention comprises the following steps: (A1)) receiving a file request instruction from an application server; (A2) analyzing said file request instruction, and creating an information file generation task and at least one temporary information file generation task according to the result of the analysis; (A3) processing said at least one temporary information file generation task based on a database and updating the state of said at least one temporary information file generation task; (A4) monitoring the execution of said at least one temporary information file generation task and updating the state of the tasks, and constructing a response information related to the generation condition of the information file when the execution of all of said temporary information file generation tasks is completed; (A5) transmitting said response information to said application server. Preferably, said response information comprises the finally generated information file.

Preferably, in the information file generating method based on parallel processing according to the embodiment of the present invention, said step (A2) further comprises: (B1) analyzing said file request instruction, and creating said information file generation task in an information file task table according to the results of the analysis; (B2) decomposing said information file generation task based on said file request instruction and according to the number of records in said database and the distribution regularities of the records to be processed, and creating said at least one temporary information file generation task in an information file task temporary table.

Preferably, in the information file generating method based on parallel processing according to the embodiment of the present invention, said step (A4) further comprises: (C1) monitoring the tasks in said information file task table and said information file task temporary table and updating the state of the tasks; (C2) combining the files generated based on said information file generation task according to said updated state of the tasks, and constructing the response information related to the generation condition of the information file. Preferably, said step (C2) further comprises adding labels and safety control information for said combined files.

Preferably, in the information file generating method based on parallel processing according to the embodiment of the present invention, said information file task table has at least one state flag bit corresponding to each of said temporary information file generation task.

Preferably, in the information file generating method based on parallel processing according to the embodiment of the present invention, each of said information file task temporary table has the state flag bit corresponding to temporary information file generation task represented by it.

From the above, in the information file generating method based on parallel processing according to the embodiment of the present invention, the information file task temporary table is used, and at least one temporary information file generation task is created therein. Therefore, in the case where the amount of data corresponding to said file request instruction is very large, and generating information file is much time-consuming, it is possible to decompose one larger task into multiple smaller tasks, which can make full use of the concurrent characteristic of the system in order to enhance the capacity of generating information file greatly. On the other hand, it is possible to reduce the coupling degree between modules in the system and it will reduce the particle size of abnormity processing, thereby may improve the generation efficiency of information file significantly.

Preferably, in the information file generating method based on parallel processing according to the embodiment of the present invention, when the state of said temporary information file generation task (e.g. completed, abnormal termination, or the like) changes, the state of the state flag bit corresponding to said temporary information file generation task in said information file task table is updated.

Preferably, in the information file generating method based on parallel processing according to the embodiment of the present invention, said information file task table corresponds to said at least one information file task temporary table (i.e., the correspondence between said information file task table and said at least one information file task temporary table is 1:N (N$>=$1), therefore, monitoring the state information of 1+N pieces of tasks in real-time is needed.

Preferably, in the information file generating method based on parallel processing according to the embodiment of the present invention, when the state flag bit in said information file task table indicates "temporary file is being generated", said at least one information file task temporary table is queried, and when it is found that all of said temporary information file generation tasks corresponding to said at least one information file task temporary table are completed, the state flag bit in said information file task table is updated into indicating "the generating of the temporary file is completed".

Preferably, in the information file generating method based on parallel processing according to the embodiment of the present invention, when a portion of said temporary information file generation tasks corresponding to said at least one information file task temporary table are terminated abnormally, the state flag bit in said information file task table is updated into indicating "temporary file is terminated abnormally", and the abnormally terminated temporary information file generation task no longer be processed continuatively.

Alternatively, in the information file generating method based on parallel processing according to the embodiment of the present invention, when there occurs the abnormal termination in said temporary information file generation task corresponding to said at least one information file task temporary table, the state flag bit in said information file task table is updated into indicating "regenerating", and said abnormally terminated temporary information file generation task is restarted to be processed. One skilled in the art should understand that, the reasons of said abnormal termination can be an abnormal database connection, file NFS network interruption, or the like. From the above, when the typical abnormality described above occurs, by increasing the number of attempts, it is possible to enhance program adaptive fault tolerant ability and reduce the time consumption caused by re-processing of the entire task.

Preferably, in the information file generating method based on parallel processing according to the embodiment of the present invention, when there occurs the abnormal termination in all of said temporary information file generation tasks corresponding to said at least one information file task temporary table, the state flag bit in said information file task table is updated into indicating "the file is terminated abnormally".

Preferably, in the information file generating method based on parallel processing according to the embodiment of the present invention, when the state flag bit in said information file task table indicates "the generating of temporary file is completed", the files generated based on said information file generation task are combined and labels and safety control information are added to said combined files, as well as the state flag bit in said information file task table is updated into indicating "the generating of file is completed".

Preferably, in the information file generating method based on parallel processing according to the embodiment of the present invention, when the state flag bit in said information file task table indicates "the generating of file is completed" or "the file is terminated abnormally", the response information related to the generation condition of the information file is constructed, and said response information (including the finally generated information file) is transmitted to said application server, as well as the state flag bit in said information file task table is updated into indicating "normal completed all" or "abnormal completed all".

Preferably, in the information file generating method based on parallel processing according to the embodiment of the present invention, multiple temporary information file generation tasks are concurrently (simultaneously) processed. From the above, the information file generated by the information file generating system based on parallel processing disclosed in the present invention may provide personalized extraction, calculation and transformation of database records to file records.

Preferably, in the information file generating method based on parallel processing according to the embodiment of the present invention, a polling mode is employed to monitor said information file task temporary table one by one in real-time, and the temporary information file generation task whose state is "abnormal" or "pseudo normal" is investigated. Preferably, the investigated abnormal temporary information file generation task is processed, and the state of said temporary information file generation task is updated into "normal" after the processing is completed, as well as said temporary information file generation task is re-executed.

Preferably, in the information file generating method based on parallel processing according to the embodiment of the present invention, it can be further proceeded to update said information file task table based on the response instruction (i.e., the confirmation message sent by the application server) sent by said application server.

Although the present invention is described by way of the preferred implementation described above, but its realization form is not limited to the above implementation. It should be recognized that various changes and modifications can be made to the present invention by one skilled in the art without departing from the spirit and scope of the invention.

What is claimed is:

1. An information file generating method based on parallel processing comprising:
   receiving and analyzing a file request instruction from an application server;
   monitoring an execution of an information file generation task and updating a state of a plurality of temporary information file generation tasks, and constructing a response information related to a generation condition of an information file;
   processing said temporary information file generation tasks based on a database and concurrently updating the state of each of the plurality of temporary information file generation tasks;
   processing abnormal events for each of said temporary information file generation tasks;
   transmitting said response information to said application server according to an instruction of said execution monitoring, and receiving a confirmation message from said application server;
   wherein, said receiving and analyzing includes:
   analyzing said file request instruction, and creating said information file generation task in an information file task table according to results of the analysis;
   decomposing said information file generation task based on said file request instruction and according to a number of records in said database and distribution regularities of the records to be processed, and creating said at least one temporary information file generation task in an information file task temporary table;
   wherein, said execution monitoring includes:
   state monitoring the information file generation task and the temporary information file generation tasks respectively in said information file task table and said information file task temporary table and updating the state of the information file generation task and the temporary information file generation tasks;
   combining files generated based on said information file generation task according to said updated state of the information file generation task and the temporary information file generation tasks, and constructing the response information related to the generation condition of the information file:
   wherein, when a state flag bit in said information file task table indicates "temporary file is being generated", said state monitoring queries said at least one information file task temporary table, and when it is found that all of said temporary information file generation tasks corresponding to said at least one information file task temporary table are completed, said state monitoring updates the state flag bit in said information file task table into indicating "the generating of the temporary file is completed".

2. The information file generating method based on parallel processing of claim 1, wherein, said information file task table has at least one state flag bit corresponding to each of said temporary information file generation tasks.

3. The information file generating method based on parallel processing of claim 2, wherein, when the state of said temporary information file generation task changes, said state monitoring updates the state of the state flag bit corresponding to said temporary information file generation task in said information file task table.

4. The information file generating method based on parallel processing of claim 3, wherein, said information file task table corresponds to said at least one information file task temporary table.

5. The information file generating method based on parallel processing of claim 1, wherein, when a portion of said temporary information file generation tasks corresponding to said at least one information file task temporary table are terminated abnormally, said state monitoring updates the state flag bit in said information file task table into indicating "temporary file is terminated abnormally", and no longer continue to process the abnormally terminated temporary information file generation task.

6. The information file generating method based on parallel processing of claim 5, wherein, when there occurs the abnormal termination in said temporary information file generation task corresponding to said at least one information file task temporary table, said state monitoring updates the state flag bit in said information file task table into indicating "regenerating", and restarts to process said abnormally terminated temporary information file generation task.

7. The information file generating method based on parallel processing of claim 6, wherein, when there occurs the abnormal termination in all of said temporary information file generation tasks corresponding to said at least one information file task temporary table, said state monitoring updates the state flag bit in said information file task table into indicating "the file is terminated abnormally".

8. The information file generating method based on parallel processing of claim 7, wherein, when the state flag bit in said information file task table indicates "the generating of temporary file is completed", said information file generating method combines the files generated based on said information file generation task and updates the state flag bit in said information file task table into indicating "the generating of file is completed".

9. The information file generating method based on parallel processing of claim 8 wherein, when the state flag bit in said information file task table indicates "the generating of file is completed" or "the file is terminated abnormally", said file generating constructs the response information related to the generation condition of the information file, and updates the state flag bit in said information file task table into indicating "normal completed all" or "abnormal completed all".

10. The information file generating method based on parallel processing of claim 9 wherein, said response information comprises the finally generated information file.

11. The information file generating method based on parallel processing of claim 10, wherein, said abnormal event processing employs a polling mode to monitor said information file task temporary table one by one in real-time, and investigates the temporary information file generation task whose state is "abnormal" or "pseudo normal".

12. The information file generating method based on parallel processing of claim 11, wherein, said abnormal events processing processes the investigated abnormal temporary information file generation task, and updates the state of said temporary information file generation task into "normal" after the processing is completed, as well as reschedules said temporary task processing.

13. The information file generating method based on parallel processing of claim 12 further comprising updating said information file task table based on a response instruction sent by said application server.

* * * * *